(12) United States Patent
Kwon et al.

(10) Patent No.: US 9,036,574 B2
(45) Date of Patent: May 19, 2015

(54) METHOD FOR EXPANSIVELY TRANSMITTING CHANNEL ESTIMATION REFERENCE SIGNAL AND METHOD AND DEVICE FOR TRANSMITTING AND RECEIVING CHANNEL ESTIMATION REFERENCE SIGNAL USING SAME

(75) Inventors: Kibum Kwon, Seoul (KR); Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 409 days.

(21) Appl. No.: 13/640,011

(22) PCT Filed: Apr. 5, 2011

(86) PCT No.: PCT/KR2011/002379
§ 371 (c)(1),
(2), (4) Date: Oct. 8, 2012

(87) PCT Pub. No.: WO2011/126279
PCT Pub. Date: Oct. 13, 2011

(65) Prior Publication Data
US 2013/0039316 A1  Feb. 14, 2013

(30) Foreign Application Priority Data
Apr. 9, 2010 (KR) .................. 10-2010-0032543
Apr. 13, 2010 (KR) .................. 10-2010-0033856

(51) Int. Cl.
*H04J 11/00* (2006.01)
*H04L 5/00* (2006.01)
*H04W 72/08* (2009.01)

(52) U.S. Cl.
CPC ............ *H04J 11/0023* (2013.01); *H04L 5/0007* (2013.01); *H04L 5/0048* (2013.01); *H04L 5/0053* (2013.01); *H04W 72/085* (2013.01)

(58) Field of Classification Search
CPC ............ H04J 11/0023; H04W 72/082; H04W 72/085; H04L 5/0053; H04L 5/0048; H04L 5/0007

USPC ......... 370/241, 252, 310, 328, 329, 340, 341, 370/431, 433, 437, 464, 465; 455/403, 455/422.1, 462, 464
See application file for complete search history.

(56) References Cited

U.S. PATENT DOCUMENTS

| | | | |
|---|---|---|---|
| 2006/0009227 A1 | 1/2006 | Dudak et al. | |
| 2006/0050802 A1 | 3/2006 | Kim et al. | |
| 2009/0191835 A1* | 7/2009 | Lozano et al. | 455/334 |
| 2010/0008333 A1 | 1/2010 | Kim et al. | |
| 2010/0232384 A1* | 9/2010 | Farajidana et al. | 370/329 |
| 2010/0323709 A1* | 12/2010 | Nam et al. | 455/450 |
| 2011/0009125 A1* | 1/2011 | Shin et al. | 455/452.1 |
| 2012/0250558 A1* | 10/2012 | Chung et al. | 370/252 |

FOREIGN PATENT DOCUMENTS

| | | |
|---|---|---|
| KR | 10-2006-0022474 | 3/2006 |
| KR | 10-2008-0072500 | 8/2008 |
| WO | WO2010011078 A3 * | 3/2010 |

OTHER PUBLICATIONS

International Search Report dated Nov. 23, 2011 issued for PCT/KR2011/002379.

* cited by examiner

Primary Examiner — Obaidul Huq
(74) Attorney, Agent, or Firm — H.C. Park & Associates, PLC

(57) ABSTRACT

A method for transmitting control information to expansively transmit a channel estimation reference signal comprises the steps of: allowing a base station to determine not to transmit a channel estimation reference signal through a first frequency band, relative to a first user terminal which was set to transmit the channel estimation reference signal in the first frequency band; generating first control information which instructs a second user terminal to transmit the channel estimation reference signal in said first frequency band; and transmitting a wireless signal including said generated first control information to the second user terminal.

24 Claims, 12 Drawing Sheets

FIG.12
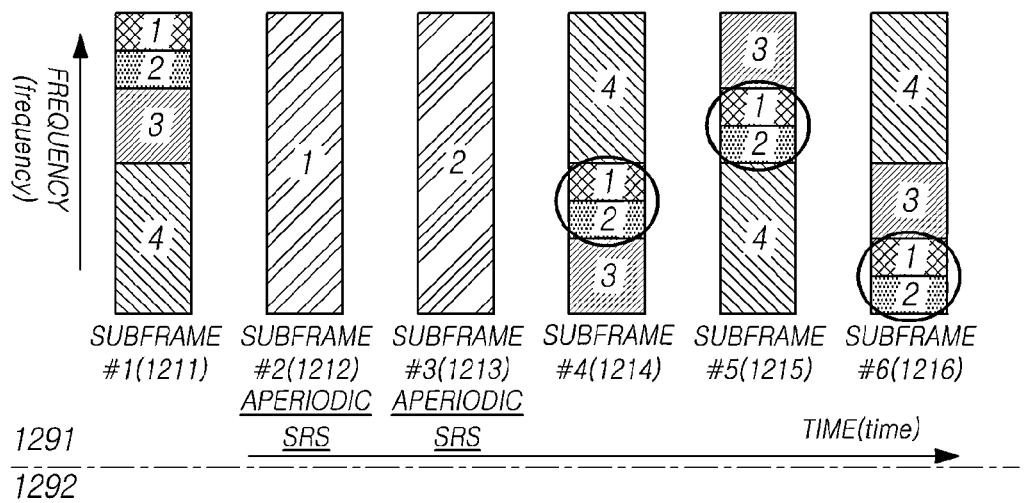
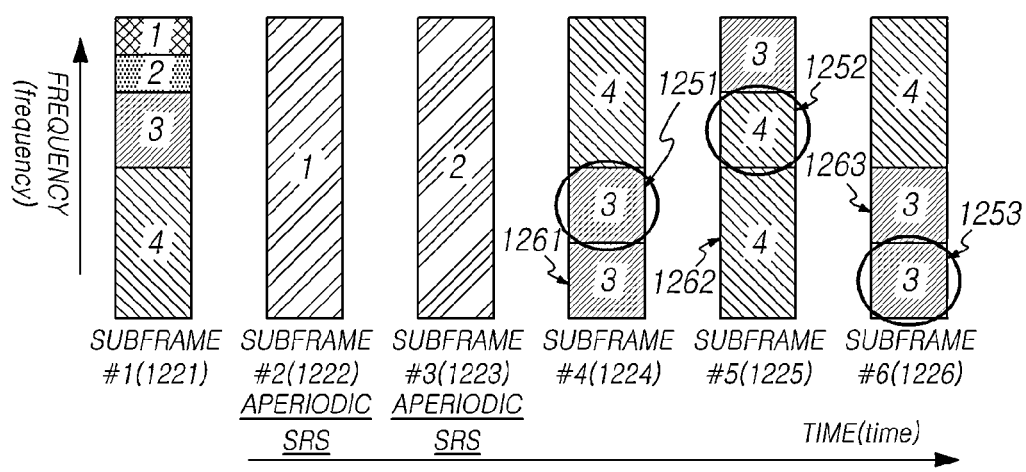

METHOD FOR EXPANSIVELY TRANSMITTING CHANNEL ESTIMATION REFERENCE SIGNAL AND METHOD AND DEVICE FOR TRANSMITTING AND RECEIVING CHANNEL ESTIMATION REFERENCE SIGNAL USING SAME

CROSS-REFERENCE TO RELATED APPLICATIONS

This application is the National Stage Entry of International Application No. PCT/KR2011/002379, filed on Apr. 5, 2011 and claims priority from and the benefit of Korean Patent Application Nos. 10-2010-0032543, filed on Apr. 9, 2010, and 10-2010-0033856, filed on Apr. 13, 2010, all of which are hereby incorporated by reference for all purposes as if fully set forth herein.

BACKGROUND

1. Field

The present invention relates to a wireless communication system, and particularly, to a method and a device for flexibly transmitting a reference signal based on a state of using resources so as to reduce waste of resources occurring due to aperiodic transmission of a channel estimation reference signal for scheduling resources in an OFDMA wireless communication system.

2. Discussion of the Background

As communication systems have developed, various wireless terminals have been utilized by consumers, such as companies and individuals.

A current mobile communication system, for example, 3GPP, Long Term Evolution (LTE), LTE-Advanced (LTE-A), and the like, may be a high capacity communication system capable of transmitting and receiving various data such as image data, wireless data, and the like, beyond providing a sound-based service. Accordingly, there is a desire for a technology that transmits high capacity data, which is comparable with a wired communication network. Also, the system is required to include an appropriate error detection scheme that minimizes loss of information and increases transmission efficiency of the system so as to enhance performance of the system.

Also, varied reference signals have been utilized in current various communication systems to provide information associated with a communication environment and the like, to a counterpart apparatus through an uplink or a downlink.

For example, an LTE system, which is one of the mobile communication methods, transmits, to a base station, a channel estimation reference signal (hereinafter referred to 'sounding reference signal' or 'SRS') indicating a channel state of a user equipment (UE) during uplink transmission, and transmits a reference signal or a cell-specific reference signal (CRS) at every subframe to recognize channel information during downlink transmission.

In general, the reference signals for channel estimation and the like may be periodically generated by a reference signal transmitting apparatus, that is, a UE in the case where the reference signal corresponds to an uplink reference signal, and a BS in the case where the reference signal corresponds to a downlink reference signal, and may be transmitted to a reference signal receiving apparatus.

Although aperiodic transmission of a channel estimation reference signal and the like has been discussed in consideration of a flexibility of a communication system and the like, a detailed scheme thereof has not yet been determined.

SUMMARY

Therefore, the present invention has been made in view of the above-mentioned problems, and an aspect of the present invention is to provide a scheme of transmitting a channel estimation reference signal based on a periodic transmission scheme and an aperiodic transmission scheme when a user equipment transmits a channel estimation reference signal in a communication system, and to provide a technique that generates minimum interference to users in the same cell or a neighbor cell while operating the transmission.

Another aspect of the present invention is to provide a technique that transmits an aperiodic channel estimation reference signal by being in balance with existing groups that periodically transmit signals and minimizing interference since there is a high probability of causing interference to another group when a group aperiodically transmits a channel estimation reference signal in a communication system that is set to periodically transmit a channel estimation reference signal base on a different scheme for each cell.

Another aspect of the present invention is to provide a method of effectively managing a residual resource created by transmission of an aperiodic channel estimation reference signal.

In accordance with an aspect of the present invention, there is provided a method of transmitting control information for expansive transmission of a channel estimation reference signal, the method including: determining, by a base station, a first user equipment, which was set to transmit a channel estimation reference signal in a first frequency band, to not transmit a channel estimation reference signal through the first frequency band; generating first control information instructing a second user equipment to transmit a channel estimation reference signal in the first frequency band; and transmitting a wireless signal including the generated first control information to the second user equipment.

In accordance with another aspect of the present invention, there is provided a method of transmitting a channel estimation reference signal, the method including: receiving, by a user equipment, a wireless signal including first control information from a base station; extracting, from the control information, information instructing transmission of a channel estimation reference signal through a first frequency band; and transmitting a channel estimation reference signal in a second frequency band including the first frequency band.

In accordance with another aspect of the present invention, there is provided a device for transmitting control information for expansive transmission of a channel estimation reference signal, the device including: a control information generating unit to determine a first user equipment, which was set to transmit a channel estimation reference signal in a first frequency band, to not transmit a channel estimation reference signal through the first frequency band, and to generate first control information instructing a second user equipment to transmit a channel estimation reference signal in the first frequency band; a coding unit to generate a wireless signal including the first control information; and a transceiving unit to transmit the wireless signal to the second user equipment.

In accordance with another aspect of the present invention, there is provided a device for transmitting a channel estimation reference signal, the device including: an indication information extracting unit to extract information instructing transmission of a channel estimation reference signal through a first frequency band, from first control information included in a wireless signal received from a base station; a channel estimation reference signal generating unit to generate a channel estimation reference signal to be transmitted in a second frequency band including the first frequency band; and a transceiving unit to receive a wireless signal including the first control information from the base station, and to transmit the channel estimation reference signal.

BRIEF DESCRIPTION OF THE DRAWINGS

FIG. 12 is a diagram illustrating a process of expanding two or more residual frequency bands and transmitting a channel estimation reference signal according to an embodiment of the present invention.

DETAILED DESCRIPTION OF THE ILLUSTRATED EMBODIMENTS

Figure 1:
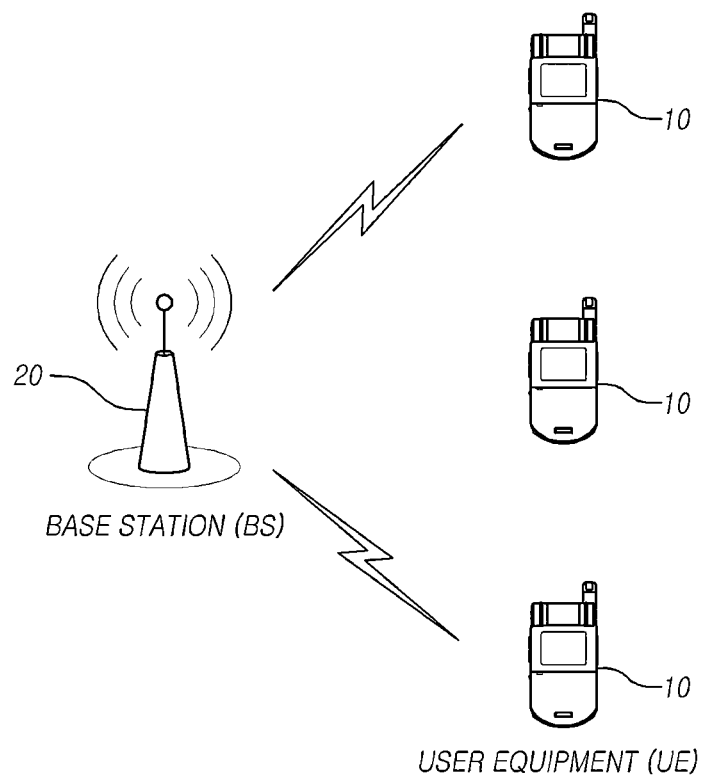
FIG. 1 is a diagram illustrating a wireless communication system according to embodiments of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a wireless communication system according to embodiments of the present invention.

The wireless communication system may be widely installed so as to provide various communication services, such as a voice service, packet data, and the like.

Referring to FIG. 1, the wireless communication system may include a user equipment (UE) 10 and a base station (BS, eNB) 20. A technique of generating a reference signal for expanded channel estimation according to embodiments of the present invention to be described in below may be applied to the user equipment 10 and the base station 20, which will be described in detail from FIG. 3.

Throughout the specifications, the user equipment 10 may be an inclusive concept indicating a user terminal utilized in wireless communication, including a UE in WCDMA, LTE, HSPA, and the like, and a mobile station (MS), a user terminal (UT), a subscriber station (SS), a wireless device, and the like in GSM. Hereinafter, a user equipment, a terminal, and a UE may be directed to the same meaning.

The base station 20 or a cell may refer to a station where communication with the user equipment 10 is performed, and may also be referred to as a Node-B, an evolved Node-B (eNB), a Base Transceiver System (BTS), an Access Point, a relay node, and the like.

That is, the base station 20 or the cell may be construed as an inclusive concept indicating a portion of an area covered by a base station controller (BSC) in CDMA, a NodeB in WCDMA, and the like, and the concept may include various coverage areas, such as a megacell, a macrocell, a microcell, a picocell, a femtocell, a communication range of a relay node, and the like.

In the specifications, the user equipment 10 and the base station 20 are used as two inclusive transceiving subjects to embody the technology and technical concepts described in the specifications, and may not be limited to a predetermined term or word.

The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like.

Uplink transmission and downlink transmission may be performed based on a Time Division Duplex (TDD) scheme that performs transmission based on different times, or based on a Frequency Division Duplex (FDD) scheme that performs transmission based on different frequencies.

An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. Embodiments of the present invention may not be limited to a specific wireless communication scheme, and may be applicable to all technical fields to which a technical idea of the present invention is applicable.

The wireless communication system may support an uplink and/or downlink HARQ, and may use a channel quality indicator (CQI) for link adaptation. Also, a multiple access scheme for downlink transmission and a multiple access scheme for uplink transmission may be different from each other. For example, a downlink may use Orthogonal Frequency Division Multiple Access (OFMDA) and an uplink may use Single Carrier-Frequency Division Multiple Access (SC-FDMA).

Layers of a radio interface protocol between a user equipment and a network may be distinguished as a first layer (L1), a second layer (L2), and a third layer (L3), based on three lower layers of a well-known Open System Interconnection (OSI) model in a communication system, and a physical layer of the first layer may provide an information transfer service through use of a physical channel.

Figure 2:
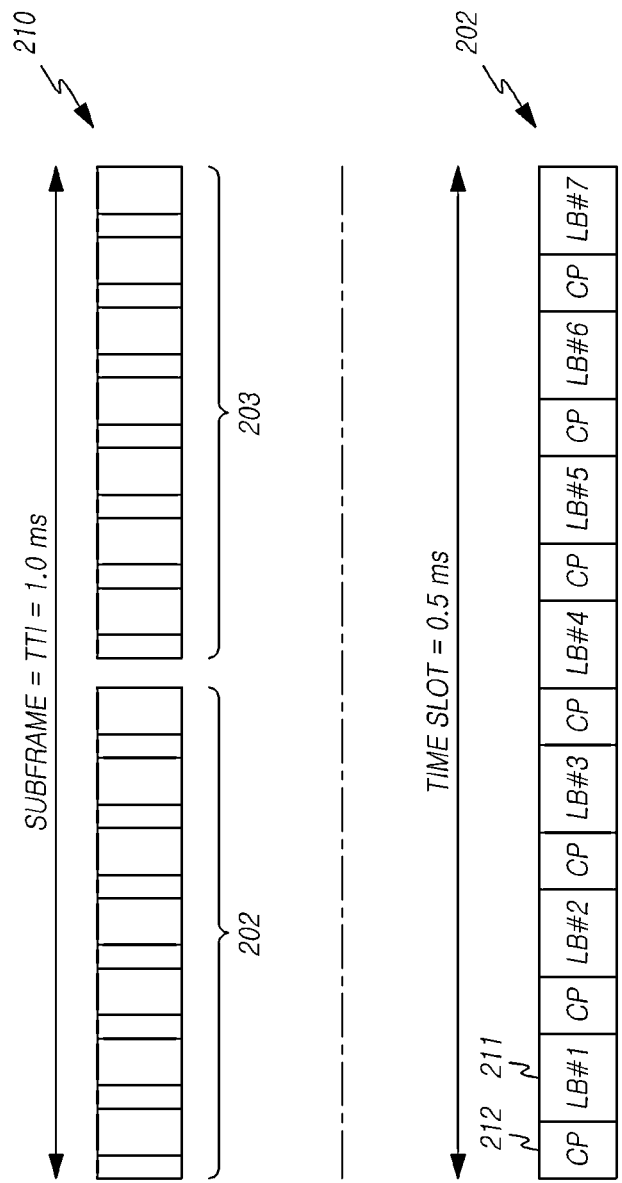
FIG. 2 is a diagram illustrating a structure of a subframe and a time-slot of transmission data according to an embodiment of the present invention.

FIG. 2 illustrates a structure of a subframe and a time-slot of transmission data according to an embodiment of the present invention.

Referring to FIG. 2, a single radio frame or a wireless frame may be formed of 10 subframes 210, and a single subframe may include two slots 202 and 203. A basic unit for data transmission may be a subframe, and uplink scheduling or downlink scheduling may be performed based on a subframe unit. A single slot may include a plurality of OFDM symbols in a time domain, and may include at least one subcarrier in a frequency domain (frequency band), and a single slot may include 7 or 6 OFDM symbols.

For example, when a subframe is formed of two time-slots, each time-slot includes 7 symbols in a time domain and 12 subcarriers in a frequency domain. Although a time-frequency domain defined by a single slot as described in the foregoing may be referred to as a resource block (RB), it may not be limited thereto.

In 3GPP LTE system, a transmission time of a frame is divided into a transmission time interval (TTI) having a duration of 1.0 ms. "TTI" and "subframe" may be directed to the same meaning, and a frame having a length of 10 ms may include 10 TTIs.

The diagram 202 illustrates a general structure of a time-slot according to an embodiment of the present invention. As described in the foregoing, the TTI may be a basic transmission unit, and a single TTI may include two time-slots 202 and 203 of the same length and each time-slot has a duration of 0.5 ms. The time-slot may include seven long blocks (LB) 211 associated with symbols. The LBs may be separated by cyclic prefixes (CPs) 212. Although a single TTI or a subframe may include 14 LB symbols, embodiments of the present invention may not be limited to the structure of the frame, the subframe, or the time-slot structure as described in the foregoing.

In an LTE communication system, which is one of the current wireless communication schemes, a demodulation reference signal (DMRS) and a sounding reference signal (hereinafter referred to as 'SRS' or 'sounding reference signal') are defined for an uplink, and three reference signals, that is, a cell-specific reference signal (CRS), a multicast/broadcast over single frequency network reference signal (MBSFN-RS), and a UE-specific reference signal, are defined for a downlink.

That is, a user equipment in the wireless communication system may transmit, to a base station, an uplink channel estimation reference signal which is one of the reference signals, so as to transfer uplink channel information to the base station.

An example of the channel estimation reference signal may include a sounding reference signal that is used in LTE and LTE-Advanced, and the channel estimation reference signal may function as a pilot channel with respect to an uplink channel.

In the specifications, embodiments of the present invention will be described based on a sounding reference signal (SRS) which is an example of the channel estimation reference signal, but the embodiments of the present invention may not be limited to the SRS and may include all types of reference signals used in an uplink or a downlink.

The SRS may need to transfer uplink channel information associated with all bands including a band to be used by each UE and a band having a probability of being used by each UE. That is, the SRS may need to be transmitted over the entire subcarrier band.

According to the current LTE standard, an SRS sequence may be generated based on Equation 1, and the generated SRS sequence may go through resource mapping based on a predetermined criterion and may be transmitted based on a subframe setting as shown in Table 1.

$$r^{SRS}(n) = r_{u,v}^{(\alpha)}(n) = e^{j\alpha n}\bar{r}(n), 0 \le n \le M_{sc}^{RS}$$ [Equation 1]

Here, $M_{sc}^{RS} = mN_{sc}^{RB}$ denotes a length of a reference signal sequence, and $1 \le m \le N_{RB}^{max,UL}$. u denotes a PUCCH sequence group number, v denotes a base sequence number, and a cyclic shift (CS)

$$\alpha = 2\pi \frac{n_{SRS}^{cs}}{8}.$$

$n_{SRS}^{cs}$ may be an integer value in a range from 0 through 7, and may be set for each UE by a upper layer.

TABLE 1

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Inf | N/A |

Table 1 may be a subframe setting table of an FDD sounding reference signal, defined in LTE. Each srsSubframeConfiguration may be defined by 4 bits, and a transmission period and an offset of a transmission subframe may be defined for each case.

That is, when a value of srsSubframeConfiguration is 8 (1000 in the binary system), an SRS may be transmitted at second and third subframes in every five subframes.

Figure 3:
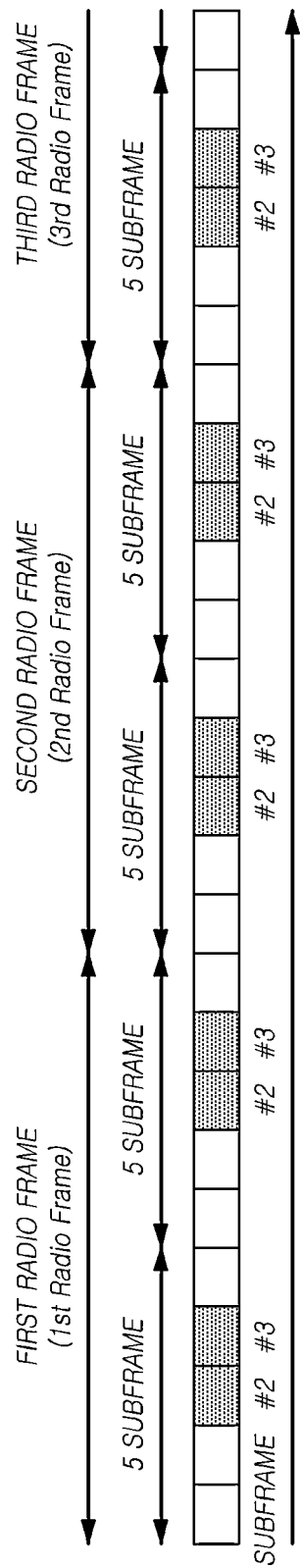
FIG. 3 is a diagram illustrating an example of periodic SRS transmission in a communication system according to an embodiment of the present invention.

FIG. 3 illustrates an example of periodic SRS transmission in a communication system according to an embodiment of the present invention. For example, when a value of srsSubframeConfiguration is 8 (1000 in the binary system), an SRS may be transmitted at second and third subframes in every five subframes.

However, the SRS may be transmitted at the last symbol of each subframe, but it may not be limited thereto.

According to the SRS setting as shown in Table 1 and FIG. 3, an SRS may be periodically transmitted at each radio frame or each transmission period, for each cell (base station).

In a case where srcSubframeConfiguration is 8 of Table 1, a configuration period is 5 subframes, and a transmission offset corresponds to 2 and 3. FIG. 3 illustrates a case that transmits an SRS at a subframe #2 and a subframe #3 in every five subframes.

TABLE 2

| srsSubframeConfiguration | Binary | Configuration Period $T_{SFC}$ (subframes) | Transmission offset $\Delta_{SFC}$ (subframes) |
|---|---|---|---|
| 8 | 1000 | 5 | {2, 3} |

However, as a communication system has advanced, a number of antennas increases, such as a multi input multi output (MIMO), and a communication system, such as a Cooperative MultiPoint Tx/Rx System (CoMP) and the like, that requires transmission and reception of a reference signal with a neighbor cell in addition to a serving cell that mainly performs transmission and reception with a corresponding user has been introduced. Therefore, the periodic SRS transmission scheme may have difficulty in obtaining a sufficient SRS capacitor.

Accordingly, it has been discussed that scheduling flexibility of an SRS needs to be increased by adjusting an SRS which is transmitted periodically to be transmitted aperiodically, so as to improve the SRS capacitor.

Figure 4:
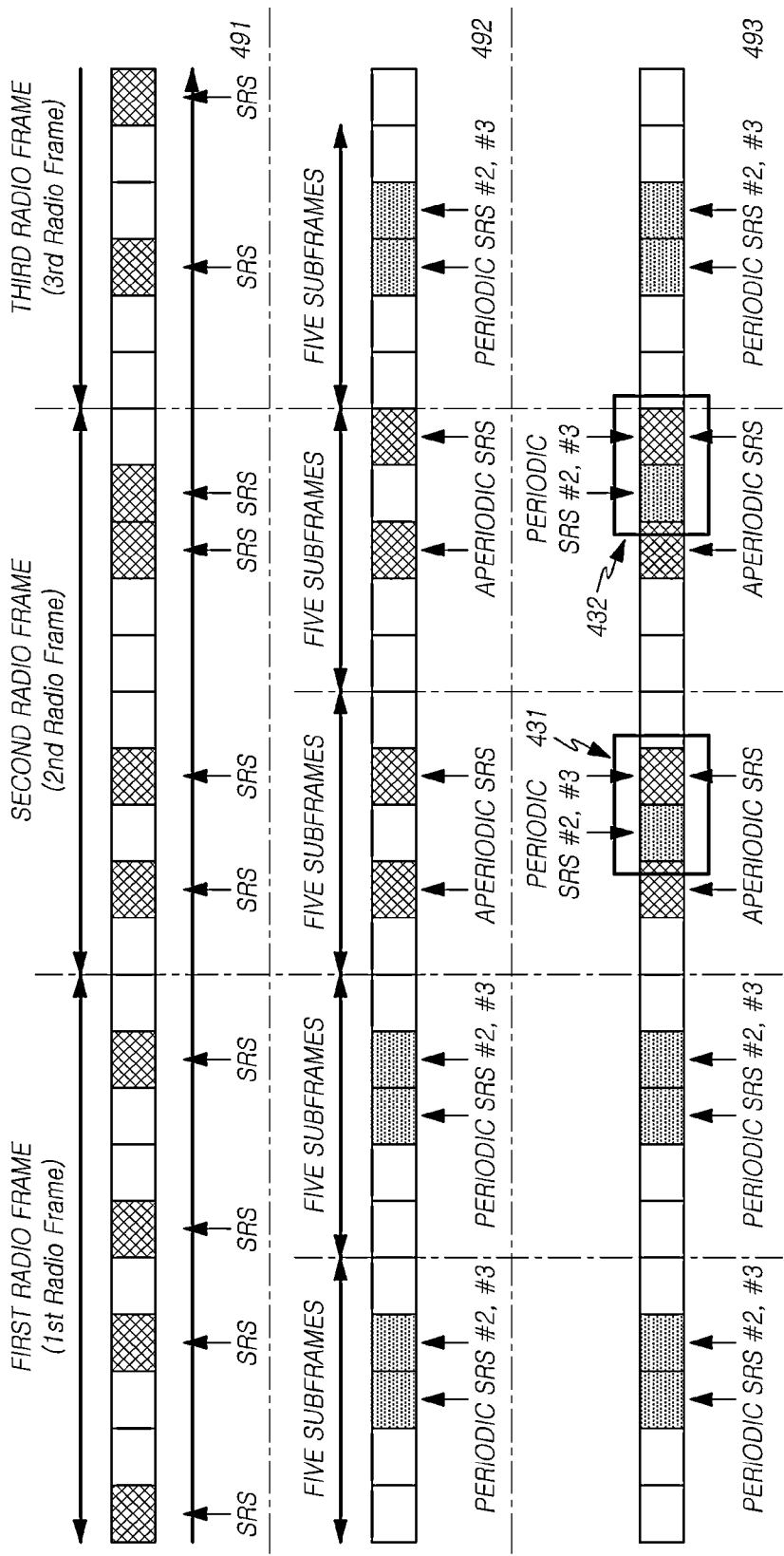
FIG. 4 is a diagram illustrating an example of aperiodically transmitting an SRS, an example of transmitting an aperiodic SRS and a periodic SRS together, and an example of switching an aperiodic SRS and a periodic SRS according to an embodiment of the present invention.

An example of adjusting an SRS to be transmitted aperiodically may be as follows. FIG. 4 is a diagram illustrating an example of aperiodic SRS transmission, and FIG. 4 is a diagram illustrating an example of aperiodic SRS transmission, an example of transmitting an aperiodic SRS and a periodic SRS together, and an example of switching a periodic SRS and an aperiodic SRS according to an embodiment of the present invention.

The diagram 491 of FIG. 4 illustrates a subframe in which an SRS signal is aperiodically transmitted within a single radio frame, and a periodic SRS is not transmitted, other than an aperiodic SRS.

The diagram 492 illustrates an example in which aperiodic SRS transmission and periodic SRS transmission are performed together. For example, an SRS may be periodically transmitted at a first period and a second period corresponding to a first radio frame, using 5 subframes as a single period. An SRS may be aperiodically transmitted at a third period and a fourth period corresponding to a second radio frame, and an SRS may be periodically transmitted again at a fifth period corresponding to a third radio frame.

However, a problem may occur when the aperiodic SRS and the periodic SRS are switched as shown in the diagram 493. That is, as illustrated in the diagrams 431 and 432, there may be a problem in that an existing periodic SRS of another UE is transmitted as it is, in addition to an aperiodic SRS. Unlike the diagram 493, although not illustrated, a periodic SRS needs to be transmitted after aperiodic SRS transmission is completed, but a periodic SRS is not transmitted and a corresponding frequency resource may be wasted since a switching time does not match.

That is, a time for the periodic SRS transmission and a time for the aperiodic SRS transmission overlap each other, or periodic/aperiodic SRS transmission is not performed at all.

The SRS transmission that is periodically performed may be adjusted to be aperiodically performed as shown in the diagrams 491, 492, and 493 of FIG. 4 so as to increase a scheduling flexibility, and an aperiodic SRS may be embodied by a one-shot SRS, an SRS through a DM-RS, a burst SRS, and the like so as to improve an SRS capacitor. In the process, a frequency resource which is a residual sub-band remaining after the aperiodic SRS may need to be effectively used. That is, use of a sub-band may be different from an initial scheduling due to the aperiodic SRS transmission and thus, resources may not be often used. Therefore, a method of effectively using resources associated with the aperiodic SRS, for example, frequency resources according to an embodiment of the present invention, will be described.

The embodiment of the present invention of FIG. 4, may enable another user equipment to use a frequency resource in which periodic SRS transmission is not required due to aperiodic SRS transmission. When a channel estimation reference signal is transmitted, a predetermined user equipment performs aperiodic transmission so that another user equipment may use a periodic transmission section of a channel estimation reference signal, which is allocated to the corresponding user equipment. Accordingly, imbalance in use of resources due to the aperiodic transmission may be reduced and a number of resources that are not used may be decreased and thus, efficiency in use of a network may be improved.

Figure 5:
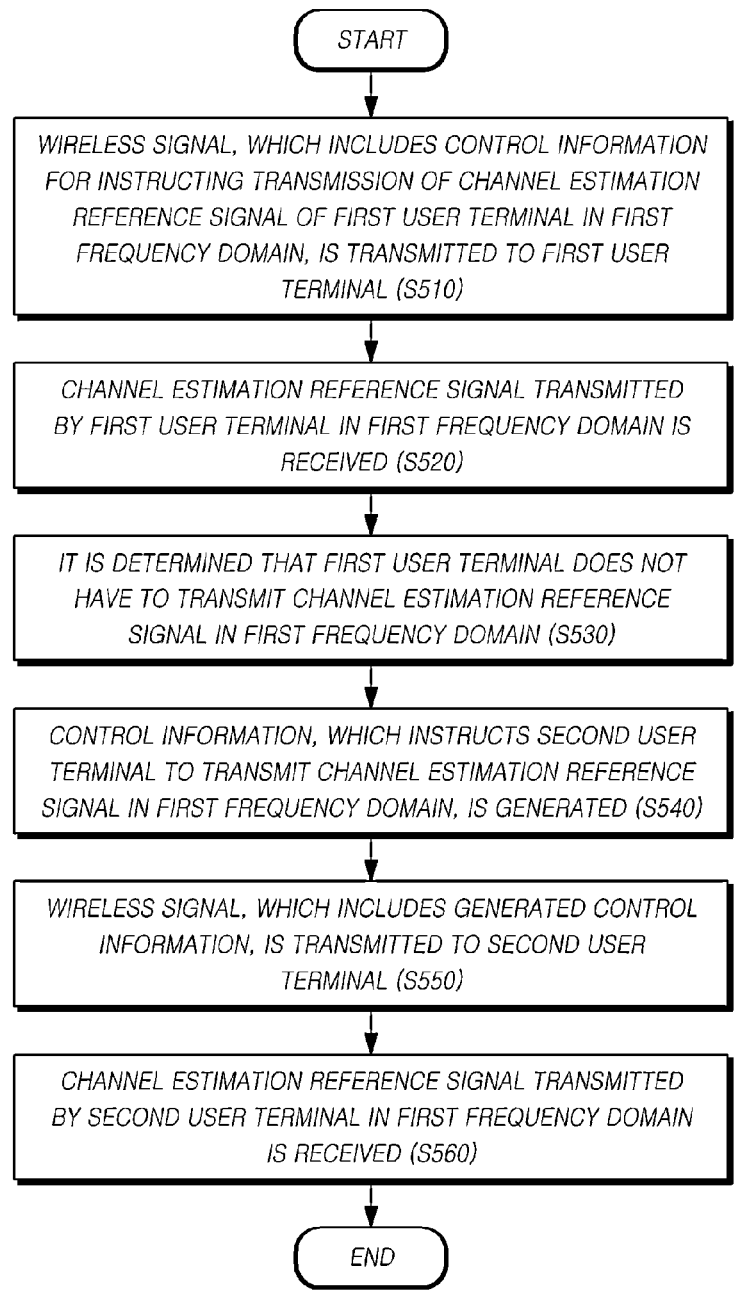
FIG. 5 is a diagram illustrating a process in which a base station transmits control information for expansive transmission of a channel estimation reference signal according to an embodiment of the present invention.

FIG. 5 is a diagram illustrating a process in which a base station transmits control information for expansive transmission of a channel estimation reference signal according to an embodiment of the present invention.

FIG. 5 includes a process in which a base station generates control information and transmits the generated control information to a second user equipment so that, when the second user equipment transmits a periodic channel estimation reference signal, the second user equipment uses a frequency domain that may not be used by a first user equipment any longer since the first user equipment transmits an aperiodic channel estimation reference signal, that is, a region in which an aperiodic channel estimation reference signal is previously transmitted. To achieve the above, a process of receiving an aperiodic or expanded channel estimation reference signal from the first user equipment may be additionally included.

A wireless signal including control information instructing transmission of a channel estimation reference signal of the first user equipment in a first frequency domain may be transmitted (step S510). This may include information instructing the first user equipment to transmit an aperiodic channel estimation reference signal, and information associated with an available time for the transmission of the aperiodic channel estimation reference signal and information associated with the first frequency domain.

Subsequently, the channel estimation reference signal transmitted by the first user equipment in the first frequency domain may be received (step S520). The first frequency domain through which the channel estimation reference signal is received may be different from a region previously allocated to the first user equipment by scheduling and thus, it may be scheduled to transmit a channel estimation reference signal of the first user equipment later. However, the first user equipment has already transmitted a channel estimation reference signal in the first frequency domain in step S520 and thus, the first user equipment may not need to transmit a channel estimation reference signal with respect to the first frequency domain any longer during a predetermined period. Step S520 may include the case where a UE1 transmits an aperiodic SRS at a subframe 723 in the diagram 792 of FIG. 7 and the case where a UE1 transmits an aperiodic SRS at a subframe 810 in the diagram 892 of FIG. 8, as embodiments. Step S510 may include a case where a base station transmits a value of 11 instructing transmission of an aperiodic SRS signal for step S520.

Therefore, the base station may determine that the first user equipment may not need to transmit a channel estimation reference signal with respect to the first frequency domain (step S530). In other words, among user equipments that are scheduled to transmit a channel estimation reference signal in a predetermined frequency domain, a user equipment that already transmits a channel estimation reference signal to the corresponding frequency domain based on an aperiodic transmission scheme and the like, it may be determined that the corresponding user equipment may not need to transmit a channel estimation reference signal in the corresponding frequency domain at a corresponding point in time, during a predetermined period. An embodiment of the scheduling information associated with the transmission of the channel estimation reference signal may include Table 1.

Subsequently, control information instructing the second user equipment to transmit a channel estimation reference signal in the first frequency domain may be generated (step S540). The second user equipment may be a user equipment that does not transmit a channel estimation reference signal in the first frequency domain. Also, to decrease a size of the control information, the second user equipment may be a user equipment that is scheduled to transmit a channel estimation reference signal in a second frequency domain adjacent to the first frequency domain. The base station may effectively transmit information associated with the adjacent first frequency domain to the second user equipment since the second user equipment uses the second frequency domain adjacent to the first frequency domain. For example, an adjacent upper frequency domain having the same size as the second frequency domain or an adjacent lower frequency domain may be indicated. Information required for indicating may be indication information indicating whether a frequency domain in which a channel estimation reference signal is to be transmitted is expanded, and upper/lower information associated with an adjacent frequency domain in which a channel estimation reference signal is to be transmitted. The information may be configured as information indicating upper/lower frequency band to be described in an embodiment associated with Table 3.

The base station may transmit a wireless signal including the control information to the second user equipment (step S550). Subsequently, the second user equipment may transmit a channel estimation reference signal in the first frequency domain, and the base station may receive the channel estimation reference signal (step S560).

Figure 7:
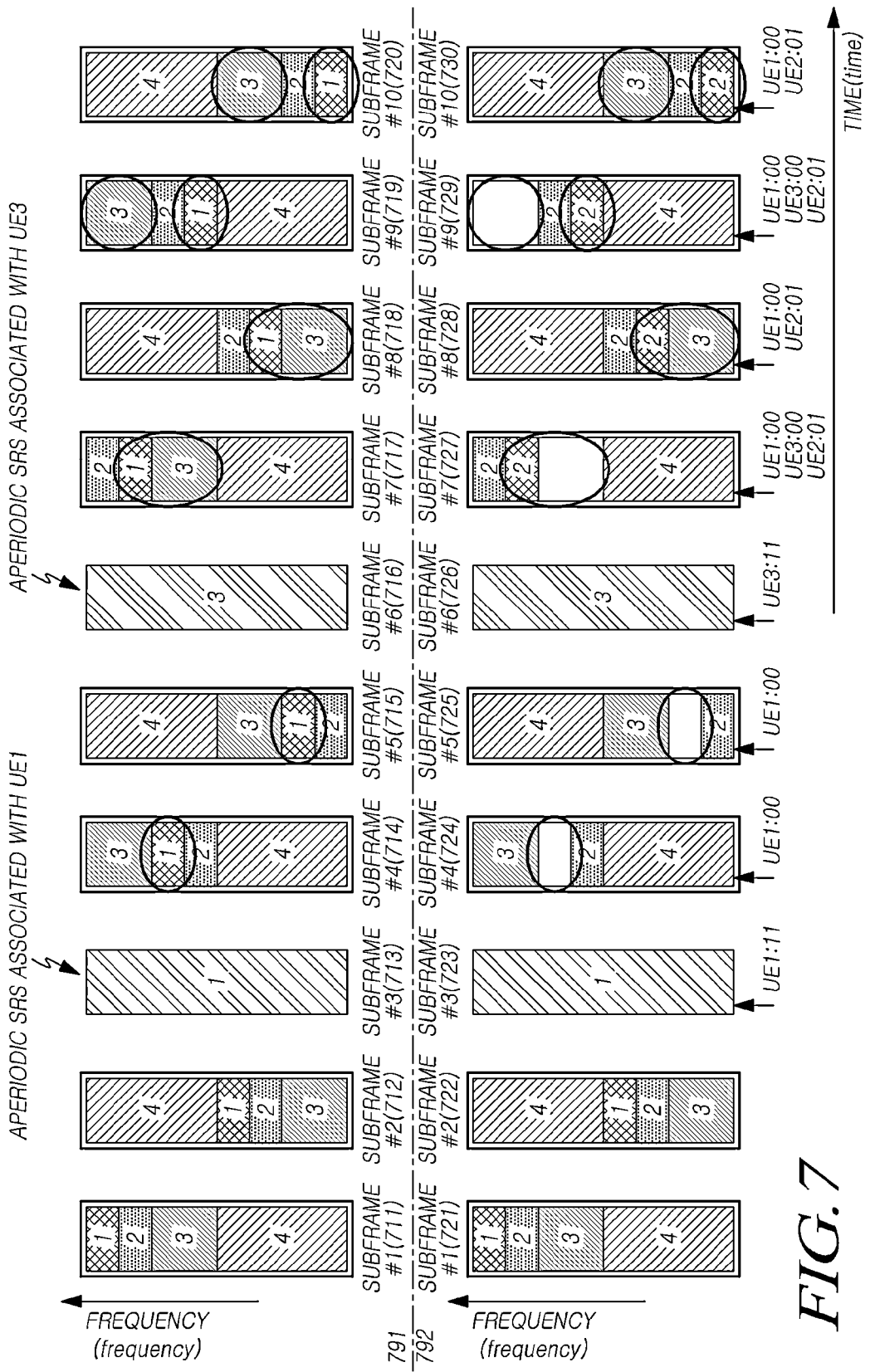
FIG. 7 is a diagram illustrating an example in which a channel estimation reference signal is expansively transmitted in a frequency domain according to an embodiment of the present invention.
Figure 8:
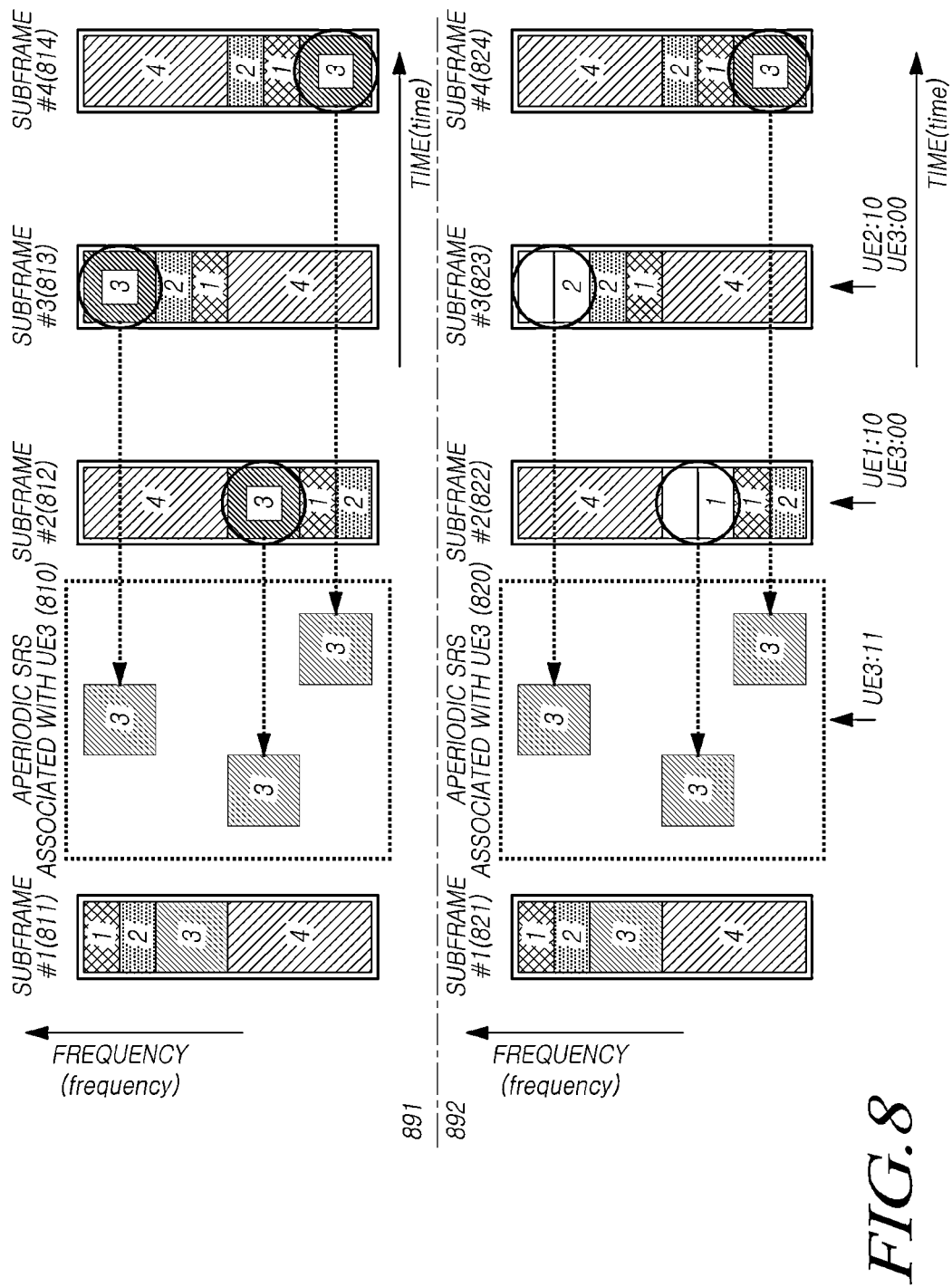
FIG. 8 is a diagram illustrating a process of using a burst scheme as one of the aperiodic SRS transmission schemes according to an embodiment of the present invention.

Step S550 and step S560 may include, as embodiments, the case in which a UE2 generates and transmits a channel estimation reference signal through a frequency domain which was scheduled to a UE1, such as the cases in subframes 727, 728, 729, and 730 of the diagram 792 of FIG. 7, and the case in which a UE1 and a UE2 generate channel estimation reference signals through a frequency domain which was allocated to a UE3, such as the cases in a subframes 822 and 823 of the diagram 892 of FIG. 8.

The first user equipment is scheduled to periodically generate a channel estimation reference signal in the first frequency domain and thus, control information instructing the first user equipment to not transmit a channel estimation reference signal with respect to the first frequency domain may be generated and transmitted after step S530. With respect to a frequency domain in addition to the first frequency domain, the second user equipment may transmit a channel estimation reference signal. Also, with respect to a frequency domain including the second frequency domain, in addition to the first frequency domain, the second user equipment may transmit a channel estimation reference signal.

In FIG. 5, a configuration of the control information that instructs the first user equipment to transmit an aperiodic channel estimation reference signal, and that instructs the second user equipment to transmit a channel estimation reference signal with respect to the first frequency domain may be as follows. As an embodiment of the channel estimation reference signal, the case of an SRS will be described as follows.

That is, according to an embodiment of the present invention, a separately defined indicator of at least 1 bit may be signaled so as to transmit indication information and thus, another user equipment transmits an SRS with respect to a frequency domain that was scheduled to be allocated to a user equipment that already performs aperiodic transmission. The signaling may be configured as below.

TABLE 3

| | Indicator | |
|---|---|---|
| Identifier | Trigger | Indication information |
| 0 | 0 | Stop periodic SRS transmission |
| 0 | 1 | Aperiodic SRS transmission through downward expansion |
| 1 | 0 | Aperiodic SRS transmission through upward expansion |
| 1 | 1 | Trigger aperiodic SRS transmission |

The indicator of Table 3 may be indication information that is transmitted by the base station to a user equipment to control transmission of an SRS. The indication information of Table 3 may be formed of information of 2 bits including an identifier of 1 bit and a trigger of 1 bit, and each piece of indication information may indicate as follows.

'00' instructs a corresponding user equipment to not transmit a periodic SRS.

'00' instructs a corresponding user equipment to expand or extend resources downward from a currently determined SRS transmission region and to transmit an SRS.

'10' instructs a corresponding user equipment to expand or extend resources upward from a currently determined SRS transmission region and to transmit an SRS.

'11' instructs a corresponding user equipment to trigger an aperiodic SRS. When a user equipment that receives '11' was scheduled to transmit a periodic SRS at a corresponding point in time, the user equipment may transmit one of them based on priority.

According to an embodiment of the present invention, the aperiodic SRS transmission and the periodic SRS transmission of a user equipment may be controlled through use of the indication information of 2 bits. For example, the first user equipment may be controlled to transmit an aperiodic channel estimation reference signal, for example, an SRS, by transmitting '11'.

The first user equipment may not need to transmit a channel estimation reference signal with respect to the first frequency domain any longer and thus, the indication information may instruct the second user equipment to transmit a channel estimation reference signal in the first frequency domain. An embodiment of the information may be '01' or '10' of Table 3.

When the base station according to an embodiment of the present invention includes '01' in control information and transmits the control information to the second user equipment, this may indicate that a frequency domain that has the same size as the second frequency domain and is located in a lower position/downward from the second frequency domain in which the second user equipment is originally scheduled to transmit a channel estimation reference signal, is the first frequency domain, and a channel estimation reference signal may also be transmitted in the first frequency domain.

Accordingly, the second user equipment may transmit a channel estimation reference signal through both the first frequency domain and the second frequency domain and thus, a waste of frequency resources may be prevented. According to another embodiment of the present invention, to indicate a location of the first frequency domain, information associated with how far a frequency domain is located upward or downward from the second frequency domain based on a frequency band may be provided, or to indicate a size of the first frequency domain based on the second frequency domain, indication information indicating that the first frequency domain is ½ times, one time, or two times larger than the size of the second frequency domain may be separately provided.

Although the first user equipment was scheduled to periodically transmit a channel estimation reference signal in the first frequency domain, the first user equipment has transmitted an aperiodic channel estimation reference signal in the first frequency domain or in a frequency domain including the first frequency domain and thus, the base station may transmit control information including '00' to the first user equipment to instruct the first user equipment to not transmit a periodic channel estimation reference signal.

Figure 6:
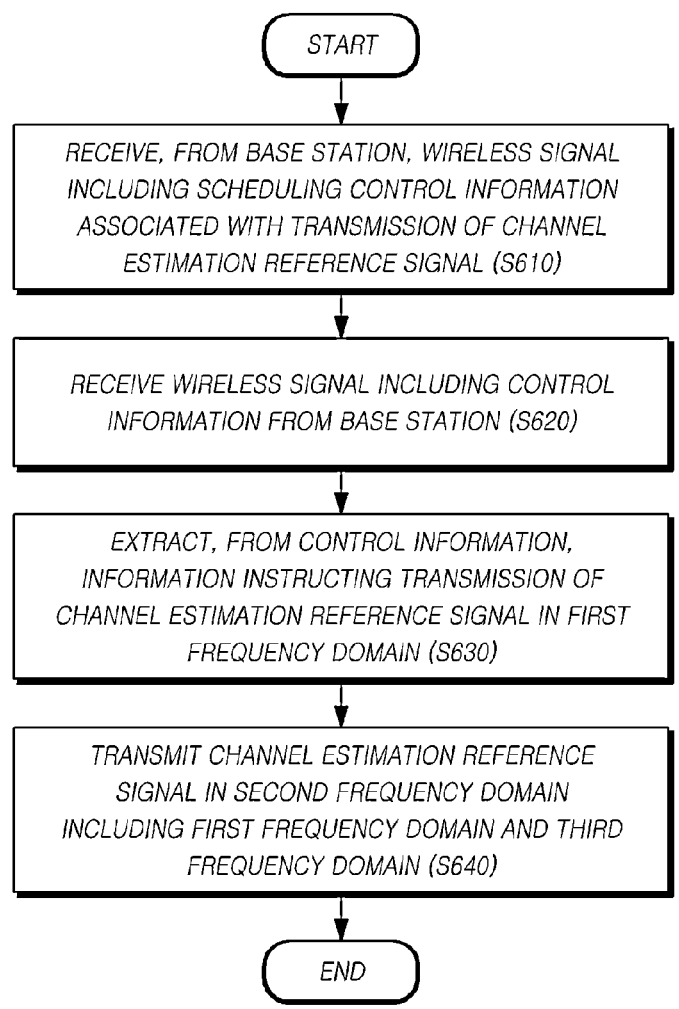
FIG. 6 is a diagram illustrating a process in which a user equipment transmits a channel estimation reference signal in an expanded frequency domain according to an embodiment of the present invention.

FIG. 6 is a diagram illustrating a process in which a user equipment transmits a channel estimation reference signal in an expanded frequency domain according to an embodiment of the present invention.

The user equipment may receive, from a base station, a wireless signal including control information associated with scheduling that instructs transmission of a channel estimation reference signal (step S610). An embodiment of the scheduling information according to an embodiment of the present invention may include Table 1. This may include an example that schedules a frequency domain in which a channel estimation reference signal is to be transmitted and allocates the scheduled frequency domain to each UE, as illustrated in the diagram 792 of FIG. 7 and the diagram 892 of FIG. 8.

Based on the scheduling information, the user equipment may schedule a time and a frequency domain for transmission of a channel estimation reference signal. Subsequently, the user equipment may receive a wireless signal including control information from the base station (step S620). The control information may include information instructing transmission of a channel estimation reference signal with respect to a first frequency domain that is not used any longer during a predetermined period since another user equipment transmits an aperiodic channel estimation reference signal. The user equipment may extract the information included in the wireless signal (step S630). The control information may include location information associated with the first frequency domain based on a third frequency domain adjacent to the first frequency domain.

The user equipment may transmit a channel estimation reference signal in a second frequency domain including the first frequency domain and a frequency domain that is previously allocated by scheduling (step S640). In particular, the user equipment may transmit a channel estimation reference signal in the second frequency domain including the third frequency domain in which a periodic channel estimation reference signal is previously scheduled to be transmitted and the first frequency domain that is received through the control information, that is, in the second frequency domain including the third frequency domain and the first frequency domain. When the indication information of Table 3 is applied, the first frequency domain may be adjacent to the third frequency domain, and may be a higher frequency domain or lower frequency domain than the third frequency domain.

In FIG. 6, the first frequency domain may indicate a residual frequency domain that may not be used by another user equipment any longer. The diagram 792 of FIG. 7, to be described hereinafter, illustrates a process in which a UE2 uses a subframe #7 727 that was scheduled to be used by a UE1. In this example, the UE2 may transmit an SRS signal using both an originally allocated frequency domain and a frequency domain allocated to the UE1.

FIG. 7 is a diagram illustrating an example in which a channel estimation reference signal is expansively transmitted in a frequency domain according to an embodiment of the present invention.

The diagram 791 of FIG. 7 illustrates a case that transmits an aperiodic SRS but does not separately transmit a periodic channel estimation reference signal to an expanded frequency domain. A number included in each of the subframes 711, 712, . . . , and 720 indicates a UE that transmits an SRS in a corresponding frequency domain. In the subframes 711, 712, 714, 715, 717, 718, 719, and 720 in which a periodic SRS is transmitted, from among the subframes 711, 712, . . . , and 720 of the diagram 791 of FIG. 7, each of the UE1, UE2, UE3, and UE4 may transmit a periodic SRS in a corresponding allocated frequency domain. An aperiodic SRS is transmitted, based on a one-shot scheme, in the subframes 713 and 716 in which a periodic SRS is not transmitted, so as to avoid collision with the periodic SRS transmission. However, the aperiodic SRS transmission is not performed only in a subframe in which a periodic SRS is not transmitted, but may be performed in a subframe in which a periodic SRS is transmitted. In this example, an SRS may be transmitted aperiodically or periodically based on a circumstance through use of priority. In the diagram 791 of FIG. 7, the UE1 transmits an aperiodic one-shot SRS between the subframe #2 712 and the subframe #4 714, that is, the subframe #3 713. When an SRS is transmitted periodically, the UE1 may need to transmit an SRS 8 times so as to perform sounding in an entire bandwidth (BW). However, an SRS is transmitted based on a one-shot scheme in a subframe between subframes in which periodic SRS transmission is scheduled, such as the subframe #3 713 between the subframe #2 712 and the subframe #4 714, as illustrated in the diagram 791 of FIG. 7 and thus, a base station may recognize channel information associated with the UE1. Therefore, whether an SRS for the UE1 is to be transmitted in the subframes 714, 715, 717, 718, 719, and 720 in which a periodic SRS is allocated for the UE1, may need to be determined. Unless it is indicated separately through a signaling and the like, the UE1 may transmit an SRS at a point in time where a periodic SRS is scheduled to be transmitted since the periodic SRS is configured through an RRC signaling. This may be identical to a situation after the UE 3 transmits an aperiodic SRS based on a one-shot scheme in the subframe #6 716.

The diagram 792 of FIG. 7 illustrates a case that transmits a periodic channel estimation reference signal to an expanded frequency domain in the same structure as the diagram 791. A number included in each of subframes 721, 722, . . . , and 730 indicates a UE that transmits an SRS in a corresponding frequency domain. In the subframes 721, 722, 724, 725, 727, 728, 729, and 730, each of the UE1, UE2, UE3, and UE4 is scheduled to transmit a periodic SRS in a corresponding allocated frequency domain. In the subframe #3 723 and the subframe #6 726, an aperiodic SRS is transmitted based on a one-shot scheme, which corresponds to an embodiment of step S510 and S520 of FIG. 5 as described in the foregoing.

The diagram 792 of FIG. 7 is an example that schedules an aperiodic SRS through a 2-bit signaling as described in Table 3. Although an example of the diagram 792 of FIG. 7 illustrates the one-shot SRS, the embodiments of the present invention may not be limited to the one-shot scheme and may be applied to all methods that transmit an aperiodic SRS and complete sounding desired by a system within a shorter period than the case of conventional periodic SRS transmission and have a residual SRS.

The subframe #1 721 and the subframe #2 722 may be periodic SRS subframes, and all user equipments (UE1, UE2, UE3, and UE4) may transmit determined periodic SRSs. In the subframe #3 723, control information '11' that requests or instructs the UE1 to transmit an aperiodic one-shot SRS may be transmitted. In an actual system, an information processing time may be expended and thus, the information may be received before an aperiodic SRS is transmitted. After the UE1 performs one-shot SRS, resources allocated or scheduled for the UE1 to periodically transmit a periodic SRS in the remaining 6 subframes 724, 725, 727, 728, 729, and 730 in which periodic SRSs are transmitted may be flexibly used through a 2-bit signaling, as described in the diagram 791. For example, in the subframe #4 724 and the subframe #5 725 which are the periodic SRS subframes, '00' information may be transmitted the UE1 so as to instruct the UE1 to not perform predetermined periodic SRS transmission. In the subframe #7 727, the subframe #8 728, the subframe #9 729, and the subframe #10 730, which are periodic SRS subframes, control information '00' may be transmitted to the UE1 and instructs the UE1 to not transmit an SRS, so as to allocate SRS resources used by the UE1 to a UE2, and control information '01' may be transmitted to the UE2 so as to instruct the UE 2 to expand an SRS resource used by the UE2, downward (to a lower frequency domain) by a size equal to the SRS resource allocated to the UE2, and to transmit an SRS. This may correspond to an embodiment of a process that determines that a predetermined user equipment does not need to transmit a channel estimation reference signal any longer, generates control information so that another user equipment transmits a channel estimation reference signal in a corresponding region, and transmits the corresponding control information to the user equipment, as illustrated in step S530, step S540, and step S550 of FIG. 5. The diagram 792 may not specify a location of a resource that transmits an SRS to minimize a signaling overhead and may indicate an expanded frequency band in which an SRS is to be transmitted according to a predetermined scheme as shown in the diagram 792 and Table 3 based on a predetermined scheduling. In particular, the diagram 792 of FIG. 7 according to an embodiment of the present invention expands an SRS resource of another user equipment adjacent to a residual SRS resource based on a frequency so that the residual SRS resource may be used. According to a predetermined scheme in addition to the method, the corresponding residual SRS may be allocated to the other user without frequency location information of the SRS resource. That is, unlike Table 3, the residual SRS resource may be allocated to the other user equipment by indicating a predetermined frequency domain or setting a size of a frequency domain.

The case of the UE3 in the diagram 792 of FIG. 7 may be understood in the same manner as the case of the UE1. After the UE3 receives '11' and transmits a one-shot SRS, the UE3 may not transmit a periodic SRS in the subframe #7 727 and the subframe #9 729, and may transmit a periodic SRS in the subframe #8 728 and the subframe #10 730. As described in the foregoing, the base station or a core network may enable an existing user equipment to transmit an SRS through use of a residual SRS resource, or may leave the residual SRS resource as an empty space, or may allocate resources to another user, through use of the 2-bit signaling.

That is, in the diagram 792 of FIG. 7, the UE1 may complete sounding with respect to an entire bandwidth through an aperiodic one-shot SRS. However, the UE1 still transmits an existing periodic SRS in a subframe. This may not cause a problem to the UE1 but a residual SRS may not be effectively used. Therefore, an embodiment of the present invention may enable the UE1 to not separately transmit a periodic SRS, may enable another user equipment to effectively use a corresponding frequency domain, or may enable the UE1 to not transmit an SRS in a corresponding region, so that interference may be reduced.

FIG. 8 is a diagram illustrating an example in which a channel estimation reference signal is expansively transmitted in a frequency domain according to another embodiment of the present invention. A subframe and a number included in the corresponding subframe may be indication information with respect to a user equipment that transmits a SRS in the corresponding subframe, as described in FIG. 7.

FIG. 8 illustrates a case that uses a burst transmission scheme as one of the aperiodic SRS transmission schemes.

The burst SRS may be a scheme that maintains a frequency band allocated to a corresponding UE and performs SRS transmission multiple times. In this example, SRSs are transmitted at one burst and thus, a time expended for sounding an entire frequency bandwidth (BW) may be decreased. In the diagram 891 of FIG. 8, corresponding resources may be sequentially transmitted at one burst based on a configuration of existing periodic SRSs. However, the transmission may be performed based on another predetermined scheme, as opposed to the configuration of the existing periodic SRSs.

In the diagram 891 of FIG. 8, a subframe #1 811, a subframe #2 812, a subframe #3 813, and a subframe #4 814 show an example in which a frequency band is allocated for a previously scheduled periodic SRS transmission. In the diagram 810, aperiodic SRS transmission of a UE3 may be performed based on a burst scheme. In this example, frequency bands set to be used by the UE3 in the subframe #2 812, the subframe #3 813, and the subframe #4 814 may become residual resources in which the UE3 may not need to transmit a periodic SRS.

The diagram 892 of FIG. 8 according to an embodiment of the present invention illustrates a process of using the residual frequency bands of the diagram 891 of FIG. 8.

After a subframe #1 821, the UE3 transmits an aperiodic SRS based on a burst scheme as illustrated in the diagram 820, which corresponds to an embodiment of step S510 and S520 of FIG. 5 as described in the foregoing. In this example, control information '11' may be transmitted to the UE3 so as to instruct the UE3 to transmit an aperiodic SRS. Subsequently, in a subframe #2 822, control information '10' may be transmitted to a UE1 so that the UE1 transmits an SRS with respect to a portion of a frequency domain in which the UE3 was scheduled to periodically transmit an SRS. Also, control information '00' may be transmitted so as to instruct the UE3 to not transmit a periodic SRS with respect to a region in which the UE3 was scheduled to aperiodically transmit an SRS. The control information may be previously transmitted and recognized by the UE1 and the UE3 in advance.

The diagram 892 of FIG. 8 may not specify a location of a resource that transmits an SRS to minimize a signaling overhead, and may indicate an expanded frequency band in which an SRS is to be transmitted according to a predetermined scheme (a scheme of designating a frequency domain to be an adjacent region) as shown in the diagram 892 of FIG. 8 and Table 3 based on a predetermined scheduling. This may correspond to an embodiment of a process that determines that a predetermined user equipment does not need to transmit a channel estimation reference signal any longer, generates control information so that another user equipment transmits a channel estimation reference signal in a corresponding region, and transmits the corresponding control information to the user equipment, as illustrated in step S530, step S540, and step S550 of FIG. 5. Therefore, in the subframe #2 822 and the subframe #3 823, each of the UE2 and the UE3 may be instructed to expand an existing region upward (to a higher frequency band) by a size of an originally allocated region, and to transmit an SRS. When transmission of a larger amount of control information is possible without a signaling overhead, information associated with a location and a size of a residual frequency band in which an expansive SRS transmission is available may be transmitted. Also, overhead may be reduced by performing signaling of information associated with a proportional relationship between a size of a frequency band and a size of an originally allocated frequency domain. For example, when control information instructing the UE1 to expand an originally set frequency domain upward by twofold and to transmit an SRS is transmitted in the subframe #2 822, an entire frequency domain that was allocated to the UE3 may be used unlike the embodiment embodied in the diagram 892 of FIG. 8. Although various embodiments that effectively use a residual resource generated in an aperiodic SRS transmission process have been provided, the present invention may not be limited thereto.

Figure 9:
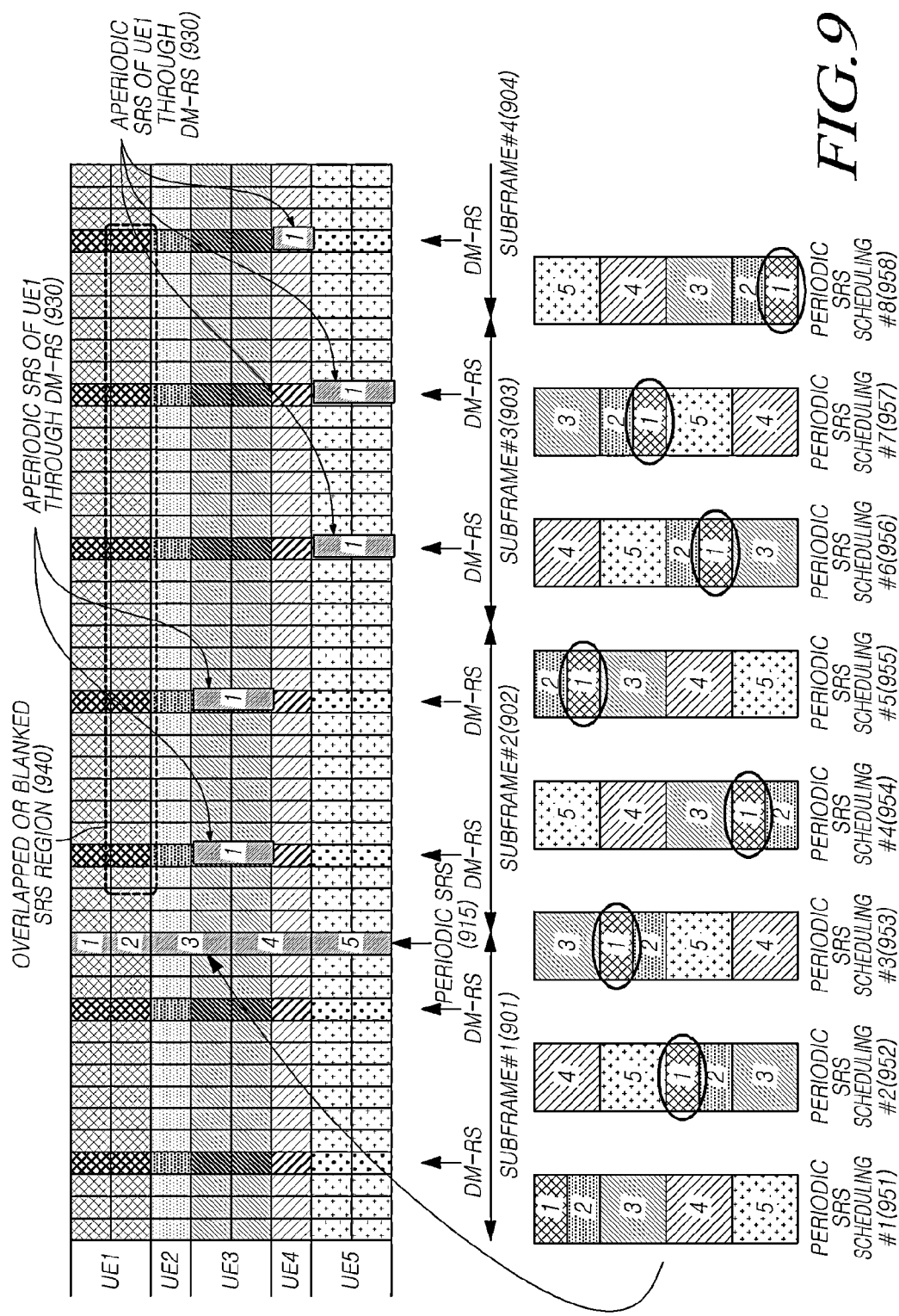
FIG. 9 is a diagram illustrating a method of transmitting an aperiodic SRS through a DM-RS according to an embodiment of the present invention.

FIG. 9 illustrates a method of transmitting an aperiodic SRS through a DM-RS according to an embodiment of the present invention.

FIG. 9 illustrates an example of transmitting an aperiodic SRS via uncoded/unused demodulation reference signal (DM-RS). In FIG. 9, 4 user equipments (UE1, UE2, UE3, and UE4) are assigned with resources, and each UE may transmit two DM-RSs for each subframe within an allocated resource region. In FIG. 9, a periodic SRS 915 is allocated to the last symbol of a first subframe 901. A resource allocated to an SRS may not be identical to a physical uplink shared channel (PUSCH) resource allocated to each UE. An SRS may need to be transmitted through an entire band and thus, SRS transmission may be performed in other regions, in addition to the PUSCH region allocated to the user equipment. At a location of a DM-RS allocated to the UE4 of the second subframe 902, it is indicated that the UE1 transmits an SRS using a DM-RS (uncoded & unused). This is a case that does not use an orthogonal cover code (OCC) and thus, the uncoded & unused DM-RS may not escape from the PUSCH resource region allocated to each UE. However, when the OCC is used, the restriction may be ineffective. Accordingly, the uncoded & unused DM-RS may be transmitted up to an amount of PUSCH allocated two or more UEs. A frequency domain of an SRS transmitted by the UE1 may be blanked or overlapped as illustrated in diagram 940. Therefore, a channel estimation reference signal may be transmitted by expanding a frequency domain to the residual region.

That is, referring to diagrams 951 through 958 in which periodic SRS transmission is scheduled, a periodic SRS scheduled in the diagram 951 may be performed as illustrated in the diagram 915, and an aperiodic SRS may be performed as illustrated in the diagram 930. Accordingly, except for the case that is scheduled as illustrated in the diagram 955, a periodic SRS of the UE1 included in the diagrams 952, 953, 954, 956, 957, and 958 may not need to be transmitted. Therefore, the residual region may be expended to enable another user equipment to use the region as described in the diagram 792 of FIG. 7 and the diagram 892 of FIG. 8. For example, in the case of the diagram 952, control information that instructs the user equipment 2 to transmit a periodic SRS may be transmitted.

In the diagram 792 of FIG. 7 and the diagram 892 of FIG. 8, another user may use a residual frequency domain in which a user equipment may not need to transmit a periodic SRS after transmitting an aperiodic SRS. Also, the user equipment may not transmit an SRS with respect to a portion or the entirety of the residual frequency domain and thus, interference may be reduced. In the subframes 822 and 823 in the diagram 892 of FIG. 8, when each of the UE1 and the UE2 expands a frequency domain by a size of the frequency domain and uses the expanded frequency domain, an empty frequency domain may be created and thus, interference to another user equipment may be reduced through use of the space.

Figure 10:
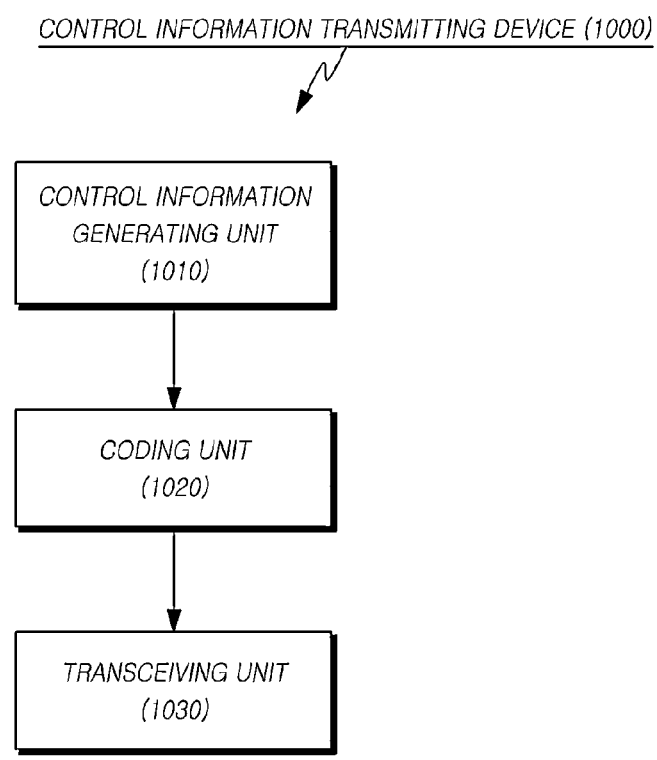
FIG. 10 is a diagram illustrating a configuration of a device for transmitting control information for expansive transmission of a channel estimation reference signal according to an embodiment of the present invention.

FIG. 10 is a diagram illustrating a configuration of a device for transmitting control information for expansive transmission of a channel estimation reference signal according to an embodiment of the present invention. The device for transmitting control information according to an embodiment of the present invention may be embodied in a base station, and when the device is embodied as a device for receiving an SRS (for example, a base station and the like) or a part of the device, the device may perform a function of generating indication information or an indicator associated with SRS transmission, transmitting the indication information of the indicator to a counterpart device (for example, a user equipment), and receiving an SRS transmitted periodically and aperiodically in response to the transmission so as to estimate an uplink channel state.

A control information transmitting device 1000 according to an embodiment of the present invention may be configured to include a control information generating unit 1010, a coding unit 1020, and a transceiving unit 1030.

In particular, the control information generating unit 1010 may determine that a first user equipment, which was scheduled to transmit a channel estimation reference signal in a first frequency domain, does not need to transmit a channel estimation reference signal in the first frequency domain, and may generate control information instructing a second user equipment to transmit a channel estimation reference signal in the first frequency domain.

The coding unit 1020 may generate a wireless signal including the control information. Although not illustrated, the coding unit may further include a scrambler, a modulation mapper, a layer mapper, a precoder, a resource element mapper, an OFDM signal generator, and the like, which are basic component elements for generating a wireless signal, but the configuration may not be positively necessary in the embodiment of the present invention.

The transceiving unit 1030 may transmit the wireless signal to the second user equipment. The second user equipment may transmit, based on the received control information, a channel estimation reference signal through the first frequency domain or a frequency domain including the first frequency domain, and the transceiving unit 1030 may receive the channel estimation reference signal.

Before the transceiving unit 1030 transmits the wireless signal to the first user equipment, the transceiving unit 1030 may transmit a wireless signal including control information instructing the first user equipment to transmit an aperiodic channel estimation reference signal in the frequency domain including the first frequency domain, and may receive a channel estimation reference signal from the first user equipment through the first frequency domain. This may correspond to a process in which the first user equipment transmits an aperiodic SRS in the first frequency domain.

Also, the second user equipment transmits a channel estimation reference signal in the first frequency domain and thus, the control information generating unit 1010 may generate control information instructing the first user equipment to not transmit a channel estimation reference signal in the first frequency domain so as to prevent the first user equipment from transmitting the channel estimation reference signal, and the transceiving unit 1030 may transmit a wireless signal including the control information to the first user equipment.

According to an embodiment of the present invention, the second user equipment was scheduled to transmit a channel estimation reference signal to a second frequency domain adjacent to the first frequency domain. In particular, the control information may include location information associated with the first frequency domain based on the second frequency domain, which has been described with reference to the diagram 792 of FIG. 7, the diagram 892 of FIG. 8, and Table 3.

The control information transmitting device 1000 may generate an indicator (indication information) that controls SRS transmission as described in the foregoing, and may transmit the generated indicator (indication information) to a corresponding UE through an L1 or L2 signaling. The indicator may be included in the control information and may be transmitted to a UE through an L1 signaling such as a PDCCH. The indicator may be formed of information indicating an adjacent frequency domain and information that controls transmission and reception of a periodic/aperiodic channel estimation reference signal, as illustrated in Table 3.

Figure 11:
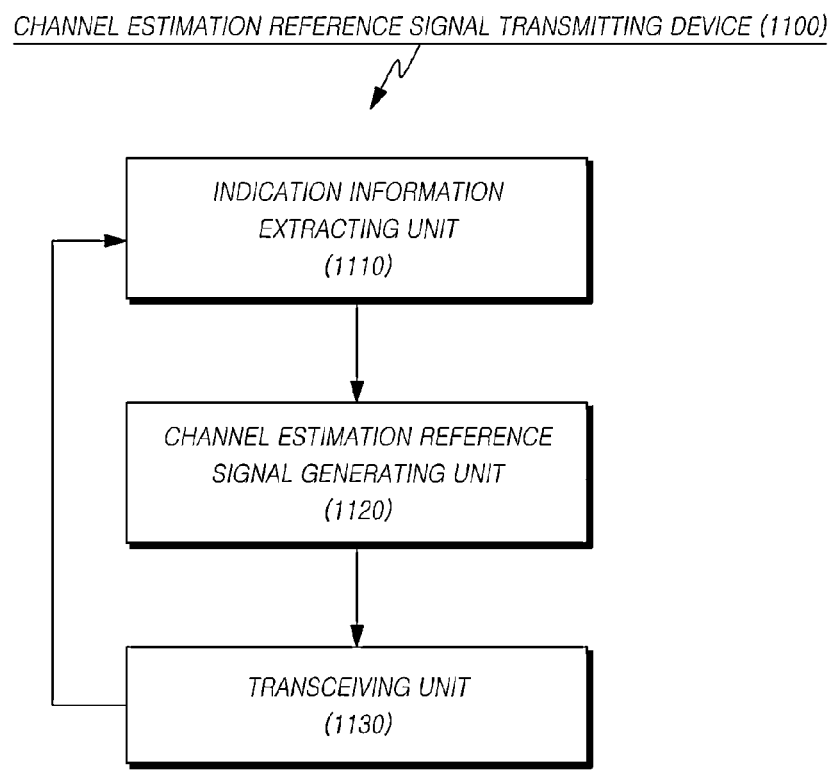
FIG. 11 is a diagram illustrating a configuration of a device for transmitting a channel estimation reference signal according to an embodiment of the present invention.

FIG. 11 is a diagram illustrating a configuration of a device for transmitting a channel estimation reference signal according to an embodiment of the present invention. The channel estimation reference signal transmitting device according to an embodiment of the present invention may be a UE or a component element included in the UE, but this may not be limited thereto.

Although not illustrated, a channel estimation reference signal transmitting device 1100 according to an embodiment of the present invention may include a scrambler, a modulation mapper, a layer mapper, a precoder, a resource element mapper, and an SC-FDMA signal generator as a general configuration of a transmitting side of a UE, and may include, as a characteristic configuration, an indication information extracting unit 1110, a channel estimation reference signal generating unit 1120, and a transceiving unit 1130. In particular, the transceiving unit 1130 may receive a wireless signal including control information from a base station. The indication information extracting unit 1110 may extract, from the control information, information indicating transmission of a channel estimation reference signal in a first frequency domain. An embodiment of the indication information has been described in the descriptions of Table 3. The channel estimation reference signal generating unit 1120 may generate a channel estimation reference signal to be transmitted in a second frequency domain including the first frequency domain, based on the indication information. For example, an example of the channel estimation reference signal may include a signal such as an SRS. The generated channel estimation reference signal may be transmitted through the transceiving unit 1130.

The transceiving unit 1130 may receive scheduling information used for transmitting a periodic channel estimation reference signal from a base station and the like. That is, before receiving the wireless signal including the control information, the transceiving unit 1130 may receive a wireless signal including control information associated with scheduling that instructs transmission of a channel estimation reference signal in a third frequency domain adjacent to the first frequency domain. Accordingly, the indication information associated with the first frequency domain may be determined based on the scheduling information received in advance, and related embodiments have been described with reference to Table 3, the diagram 792 of FIG. 7, and the diagram 892 of FIG. 8. In particular, when a user equipment is scheduled to transmit a periodic channel estimation reference signal in the third frequency domain based on the scheduling information, the control information may include information associated with a location and a size of the first frequency domain based on the third frequency domain. The transceiving unit 1130 may transmit a channel estimation reference signal in a frequency domain including the first frequency domain based on the control information.

An embodiment of the first frequency domain may include a residual frequency band that is not used by two or more user equipment any longer. In particular, when a frequency space that was allocated to the UE1 in the diagram 792 of FIG. 7, a frequency space that was allocated to the UE3 in the diagram 892 of FIG. 8, or a frequency space that was allocated to the UE1 of FIG. 9 is used as a residual frequency band, two or more residual frequency bands may be used. For example, when 1 and 2 are simultaneously blanked in the subframe #6 956 of FIG. 9, the UE3 at the bottom may expand a frequency domain upward or a UE 5 at the top may expand a frequency domain downward so as to use an expanded frequency domain, which will be described in detail with reference to FIG. 12.

FIG. 12 is a diagram illustrating a process of expanding two or more residual frequency bands and transmitting a channel estimation reference signal according to an embodiment of the present invention.

The diagram 1291 of FIG. 12 illustrates a process in which a UE1 and a UE2 transmit aperiodic SRSs in a subframe #2 1212 and a subframe #3 1213 based on a one-shot scheme, respectively. Accordingly, frequency domains of a periodic SRS allocated to the UE1 and the UE2 in subframes #4 through #6 may become residual regions.

The diagram 1292 of FIG. 12 illustrates a case in which a UE3 and a UE4 use a residual region.

In the diagram 1292, the UE1 transmits an aperiodic SRS in the subframe #2 1222 based on a one-shot scheme, and the UE2 transmits an aperiodic SRS in the subframe #3 1223 based on the one-shot scheme. That is, one-shot transmission of an aperiodic SRS is performed in the subframe #2 1222 and the subframe #3 1223 and thus, a periodic SRS transmission may not need to be performed separately. Therefore, frequency domains allocated to the UE1 and UE2 for periodic SRS transmission in the subframes #4 through #10 become residual regions. The regions may be used by the UE3 and the UE4.

For example, in the subframe #4 1224, the UE3 is allowed to use a region including regions originally allocated to the UE 1 and the UE2. Also, in the subframe #5 1225, the UE4 may expand a region by half of the originally allocated region and may transmit an SRS.

In particular, in the case of the subframe #4 1224 a region 1251 is a frequency domain that was allocated to the UE1 and UE2 for periodic SRS transmission. However, the UE1 and the UE2 have already transmitted aperiodic SRSs in the subframes #2 and #3 1222 and 1223 based on a one-shot scheme and thus, the UE and the UE2 may not need to transmit periodic SRSs in the 1251 region any longer. Accordingly, the region 1251 may be determined as a residual frequency domain, for example, the first frequency domain of FIG. 5 and FIG. 6 and thus, the UE 3 may transmit an SRS in both an originally allocated region 1261 and the region 1251 corresponding to a region expanded by a size of the region 1261.

In this manner, in the case of the subframe #5 1225, the region 1252 is a frequency domain that was allocated to the UE 1 and the UE2 for periodic SRS transmission. However, after the UE 1 and the UE2 have already transmitted aperiodic SRSs in the subframes #2 and #3 1222 and 1223 based on a one-shot scheme, the region 1252 becomes a residual frequency domain. Therefore, the UE4 is capable of utilizing the region.

In particular, the UE4 may transmit an SRS in a region 1262 that was allocated to the UE4 for periodic SRS transmission and the region 1252 (a residual frequency domain that was allocated to the UE1 and UE2, but is not used any longer). The 1252 region is half of the region 1262 and thus, the base station may indicate the UE4 to expand a region upward by half of the region and to transmit an SRS.

The subframe 6 1226 may also instruct the UE3 to expand a region downward from the originally allocated region 1263 and to transmit an SRS even in a region 1253.

Therefore, when an embodiment of the first frequency domain illustrated in FIGS. 5 and 6 is applied to FIG. 12, the first frequency domain as shown in the subframe #4 1224 may include one or more frequency domains which were allocated to one or more user equipments. That is, the UE3 may use all regions that were allocated to the UE 1 and the UE2.

Although a scheme that instructs periodic or aperiodic transmission of a channel estimation reference signal in an environment where one or more UEs exist in a single cell has been described, periodic or aperiodic transmission of a channel estimation reference signal may be instructed for each cell.

In the embodiments of the present invention, a form of a base station may include a micro base station such as a femtocell and the like, in addition to a macro base station, and may be applicable to a cell structure where a micro base station and a macro base station co-exist.

In this situation, the micro base station may have a lower mobility than the macro base station, and a number of micro base stations is smaller than a number of macro base stations. Therefore, users in the micro base station may not frequently require channel estimation reference signal reporting due to the low mobility and the micro base station may completely control all the users since a number of the existing users is small.

Therefore, due to the above-described condition, aperiodic channel estimation reference signal transmission may be more appropriate for the micro base station. That is, a channel estimation reference signal is periodically transmitted in the macro base station and a channel estimation reference signal is aperiodically transmitted in the micro base station and thus, interference associated with channel estimation reference signal transmission between the micro base station and the macro base station may be overcome and residual resources may be effectively used.

To decrease a size of a control information signaling, an embodiment of the present invention may determine a predetermined frequency domain only based on location information indicating up/down information based on a frequency domain that the UE is aware of by scheduling, as shown in Table 3, but this is merely an embodiment of the present invention. Based on the various described embodiments of the present invention, a location and a size of a frequency domain that is to be newly allocated may be used. That is, a frequency domain may be indicated that is distant by a predetermined range from a frequency domain previously recognized by a user equipment, or signaling of control information may be performed so as to calculate how many times a size of a corresponding frequency domain is greater or less than the previously recognized frequency domain. Also, a scheme that does not limit the size of the signaling of the control information, and provides an absolute value of the location and the size of the frequency domain to be newly allocated to the user equipment for use may be an embodiment of the present invention.

An aperiodic SRS may be a technology to supplement low multiplicity or extensibility of an existing SRS, which is insufficient for applying an increased number of antennas and an algorithm such as MU-MIMO, CoMP, and the like. Therefore, the technology may need to have sufficient flexibility and may need to be dynamically operated. However, in terms of a system, a residual resource may be created due to aperiodic SRS transmission, which may be a resource to be allocated to another user equipment. A method and device for using the residual resource have been described.

Although exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of transmitting control information for expansive transmission of a channel estimation reference signal, the method comprising:
 determining, by a base station, a first user equipment, which was set to transmit a channel estimation reference signal in a first frequency band, to not transmit a channel estimation reference signal through the first frequency band;
 generating first control information instructing a second user equipment to transmit a channel estimation reference signal in the first frequency band; and
 transmitting a wireless signal including the generated first control information to the second user equipment.

2. The method as claimed in claim 1, wherein, before the determining step, the method further comprises:
 receiving a channel estimation reference signal transmitted by the first user equipment through the first frequency band.

3. The method as claimed in claim 2, wherein, before receiving the channel estimation reference signal, the method further comprises:
 transmitting, to the first user equipment, a wireless signal including second control information instructing the first user equipment to transmit an aperiodic channel estimation reference signal in a second frequency band including the first frequency band.

4. The method as claimed in claim 1, wherein, after the determining step, the method further comprises:
 generating third control information instructing the first user equipment to not transmit a channel estimation reference signal in the first frequency band, and transmitting, to the first user equipment, a wireless signal including the third control information.

5. The method as claimed in claim 1, wherein, before the determining step, the method further comprises:
receiving, from the first user equipment, an aperiodic channel estimation reference signal transmitted based on one of a one-shot scheme, a demodulation reference signal (DM-RS) scheme, and a burst scheme.

6. The method as claimed in claim 1, wherein the second user equipment was scheduled to transmit a periodic channel estimation reference signal in a second frequency band adjacent to the first frequency band.

7. The method as claimed in claim 6, wherein the first control information includes frequency band location information associated with the first frequency band based on the second frequency band.

8. The method as claimed in claim 1, wherein, after transmitting the wireless signal including the first control information, the method further comprises:
receiving a channel estimation reference signal transmitted by the second user equipment in a second frequency band including the first frequency band.

9. The method as claimed in claim 1, wherein the first frequency band includes one or more frequency bands allocated to one or more user equipments.

10. A method of transmitting a channel estimation reference signal, the method comprising:
receiving, by a user equipment, a wireless signal including first control information from a base station;
extracting, from the control information, information instructing transmission of a channel estimation reference signal through a first frequency band; and
transmitting a channel estimation reference signal in a second frequency band including the first frequency band.

11. The method as claimed in claim 10, wherein, before receiving the wireless signal including the control information, the method further comprises:
receiving a wireless signal including second control information associated with scheduling that instructs transmission of a periodic channel estimation reference signal in a third frequency band adjacent to the first frequency band.

12. The method as claimed in claim 10, wherein the first control information includes frequency band location information associated with the first frequency band based on a third frequency band adjacent to the first frequency band.

13. A device for transmitting control information for expansive transmission of a channel estimation reference signal, the device comprising:
a control information generating unit to determine a first user equipment, which was set to transmit a channel estimation reference signal in a first frequency band, to not transmit a channel estimation reference signal through the first frequency band, and to generate first control information instructing a second user equipment to transmit a channel estimation reference signal in the first frequency band;
a coding unit to generate a wireless signal including the first control information; and
a transceiving unit to transmit the wireless signal to the second user equipment.

14. The device as claimed in claim 13, wherein, before transmitting the wireless signal to the second user equipment, the transceiving unit receives a channel estimation reference signal transmitted by the first user equipment through the first frequency band.

15. The device as claimed in claim 13, wherein, before receiving the channel estimation reference signal, the transceiving unit transmits, to the first user equipment, a wireless signal including second control information instructing the first user equipment to transmit an aperiodic channel estimation reference signal in a second frequency band including the first frequency band.

16. The device as claimed in claim 13, wherein the control information generating unit generates third control information instructing the first user equipment to not transmit a channel estimation reference signal in the first frequency band; and
the transceiving unit transmits a wireless signal including the third control information to the first user equipment.

17. The device as claimed in claim 13, wherein, before transmitting the wireless signal to the second user equipment, the transceiving unit receives, from the first user equipment, an aperiodic channel estimation reference signal transmitted based on one of a one-shot scheme, a demodulation reference signal (DM-RS) scheme, and a burst scheme.

18. The device as claimed in claim 13, wherein the second user equipment was scheduled to transmit a periodic channel estimation reference signal in a second frequency band adjacent to the first frequency band.

19. The device as claimed in claim 18, wherein the first control information includes frequency band location information associated with the first frequency band based on the second frequency band.

20. The device as claimed in claim 13, wherein the transceiving unit receives a channel estimation reference signal transmitted by the second user equipment in a second frequency band including the first frequency band.

21. The device as claimed in claim 13, wherein the first frequency band includes one or more frequency bands allocated to one or more user equipments.

22. A device for transmitting a channel estimation reference signal, the device comprising:
an indication information extracting unit to extract information instructing transmission of a channel estimation reference signal through a first frequency band, from first control information included in a wireless signal received from a base station;
a channel estimation reference signal generating unit to generate a channel estimation reference signal to be transmitted in a second frequency band including the first frequency band; and
a transceiving unit to receive a wireless signal including the first control information from the base station, and to transmit the channel estimation reference signal.

23. The device as claimed in claim 22, wherein, before receiving the wireless signal including the first control information, the transceiving unit receives a wireless signal including second control information associated with scheduling that instructs transmission of a channel estimation reference signal in a third frequency band adjacent to the first frequency band.

24. The device as claimed in claim 22, wherein the first control information includes frequency band location information associated with the first frequency band, based on a third frequency band adjacent to the first frequency band.

* * * * *